June 13, 1972     F. J. NAMENY     3,669,578

PUMPING APPARATUS

Filed Sept. 21, 1970     2 Sheets-Sheet 1

INVENTOR
FRANK J. NAMENY

BY *Stryker and Jacobson*

ATTORNEYS

United States Patent Office 3,669,578
Patented June 13, 1972

3,669,578
PUMPING APPARATUS
Frank J. Nameny, 5320 Beacon Hill Road,
Minnetonka, Minn. 55343
Filed Sept. 21, 1970, Ser. No. 73,970
Int. Cl. F01c 5/00; F04c 5/00; F03c 3/00
U.S. Cl. 418—45
8 Claims

ABSTRACT OF THE DISCLOSURE

A pump for fluids and gases is disclosed in which the fluid is squeezed through an annular cavity by a rotating pressure plate eccentrically driven by a drive shaft. The annular cavity is formed by bonding a rubber membrane over an annular groove. The pressure plate has an annular toroidal compression member which gyrates about the drive shaft forcing the membrane into the annular cavity. The membrane is protected from frictional forces by a special cavity shape and dual sets of bearings in the pressure plate. Variations include driving a second pump from the other side of the pressure plate.

BACKGROUND OF THE INVENTION

In the food and chemical industry it is desirable to utilize pumps which do not require lubrication of the fluid contacting parts. For this purpose, pumps employing flexible wall chambers have been found to be particularly suitable. In this type of pump the flexible chamber is progressively compressed to drive liquid from one end to the other. However, in the prior art devices the flexible member soon deteriorates and fails due to excessive friction and strain caused by the moving parts. The only way to avoid quickly wearing out these pumps is to run them slowly thus limiting their usefulness. The present invention provides a superior design for this type of pump in which the flexible member is subjected to an absolute minimum of stress and strain thus allowing a long life and high speed operation of the pump.

SUMMARY OF THE INVENTION

Briefly, the present invention contemplates a plate having an annular groove in it which is not quite complete around its circumference. A flexible rubber or plastic member is bonded over the plate so as to cover the groove and form an incomplete annular cavity therein. An intake port is provided at one end of this cavity while an outlet port is provided at the other end of the annular cavity. Positioned immediately above the flexible member is a semi-toroidal shaped member which is approximately the same shape and size as the groove and likewise, not complete. A pressure "wobble" plate driven by a drive shaft is positioned above the toroidal member so as to depress it into the annular groove in an orbital manner thereby forcing liquid around the groove from the intake port to the outlet port.

In prior art devices of this design, considerable excessive friction results from this depressional motion due to the fact that the flexible member is caused to rub against the side walls of the groove. The present invention incorporates a relatively shallow groove which has a shape very similar to the shape of the toroid which compresses the flexible member. As a consequence, the flexible member is squeezed directly against the surface of the groove rather than caused to rub along the surface. The lift of the flexible member is therefore much extended and the pump may also be operated at a higher speed. A further improvement involves the use of a dual set of bearings in the "wobble" or drive plate so that absolutely none of the rotational motion of the drive shaft is transmitted to the toroid member which rotational motion would cause the flexible member to be abraded and worn. Experiments have shown that the present dual bearing arrangement has only one-tenth the frictional forces of the prior art devices.

An additional advantage should be noted in the operation of my invention. Since the drive plate or "wobble" plate is mounted on a dual set of bearings about an angled collar, which accepts a straight drive shaft therethrough, the same drive shaft can be used to pass through a number of pumps placed side by side so that the same drive source can power a number of different pumps. This provides great flexibility in the design of the fluid pumping system since a number of pumps driven on one shaft can be operated in parallel or ganged together to increase the pressure produced in the pumping action.

Still another attractive feature of the present invention resides in an embodiment in which a second toroidal member is positioned on the other side of the drive plate so as to cyclically depress a second flexible member into a second annular groove so that two pumps are driven by one drive member.

It may thus be seen that it is an object of my invention to provide an improved pump. It is a further object of my invention to provide a pump which can be operated at high speed with a minimum of wear on the internal parts. It is a further object of may invention to provide a pump as described above which does not need to be lubricated and therefore can handle pure foods and chemicals. Further objects and advantages will become apparent from the following description and drawings.

DESCRIPTION OF THE PREFERRED EMBODIMENT

Figure 1:
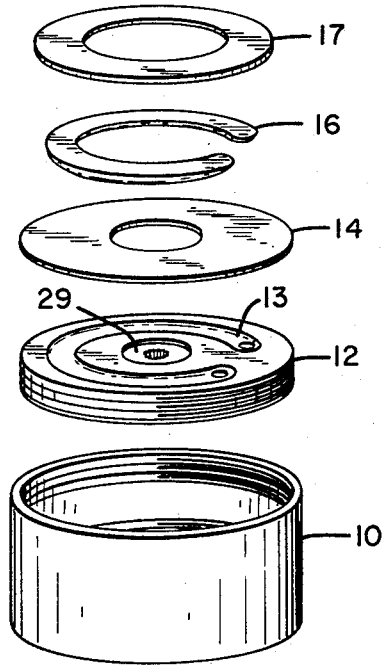
FIG. 1 is an axially exploded view of some of the major components of my invention to help explain the operation of my invention.

In FIG. 1, an exploded perspective view of some of the major components of my invention is shown. A cylindrical housing member 10 has internal threads designed to accept threaded plate member 12 which has an annular but incomplete groove 13 formed in the top surface thereof. A flexible member 14 is chemically or heat bonded to the top of member 12 so as to enclose annular groove 13 and form an incomplete annular cavity. Positioned above flexible member 14 is an almost complete toroidal member 16 which has a bottom surface shaped generally similar to the internal shape of groove 13. Consequently, if toroidal member 16 were depressed into flexible member 14, it would snugly occupy groove 13. The pumping action is achieved by driving toroidal member 16 into groove 13 in a gryatory or orbital manner so as to pump fluid from one end of groove 13 to the other end. This gryatory depression of toroidal member 16 is achieved by a wobble drive plate 20 operating against toroidal member 16 through an annular needle bearing 18. Drive plate 20 rides about a roller bearing 26 supported on an inner collar assembly 28 which has a hole therethrough at a slight angle designed to accept a drive shaft 24. Rotation of drive shaft 24 thus causes a wobbling rotation of collar 28. Bearing 26 eliminates most of the rotational motion from drive plate 20. However, the wobble motion is transmitted through to toroidal member 16. Any remaining rotational motion is effectively isolated from toroidal member 16 by needle bearing 18. A cover plate 22 is also inserted into cylindrical housing 10. Cover plate 22 has a bearing 27 therein similar to a bearing 29 in plate 12 which bearings operate to support drive shaft 24.

Figure 2:
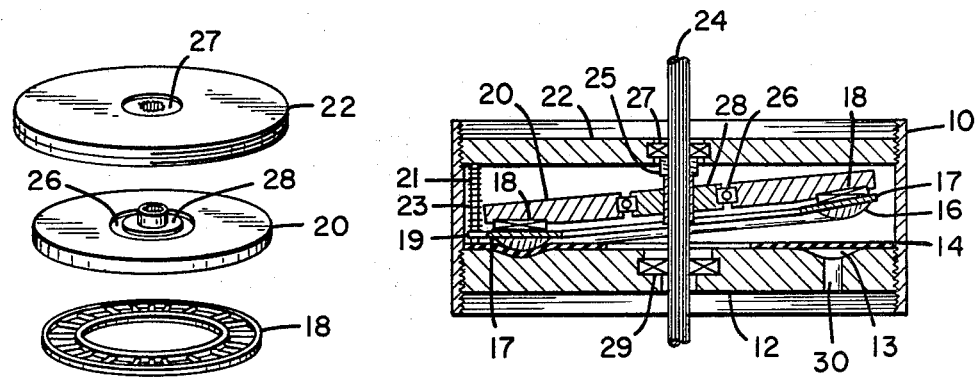
FIG. 2 is a sectional view of a single pump using the principles of the present invention showing in greater detail how the pumping motion is achieved.
Figure 3:
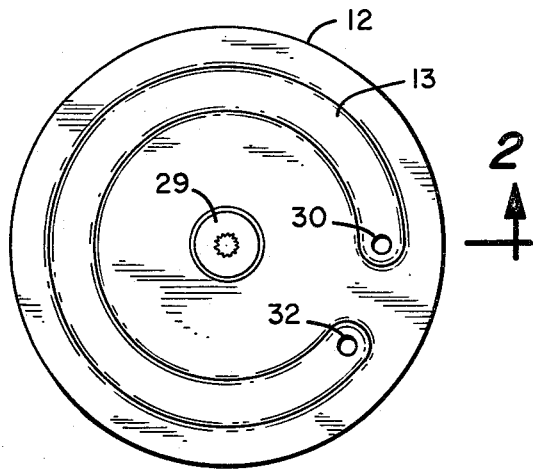
FIG. 3 is a top view of the incomplete annular groove containing plate of FIG. 2.

A sectional view of an assembled single chamber pump is shown in FIG. 2. In FIG. 2, it may be seen how cover plate 22 and base plate 12 are threaded into cylindrical housing 10. Shaft 24 is inserted through bearings 27 and 29 and through collar assembly 28 at a slight angle. Shaft 24 is shown in FIG. 2 as being splined although it could be keyed or otherwise suitably connected to collar 28 so as to rotate collar 28 about the axis of shaft 24. Since collar assembly 28 is inclined with respect to the shaft, the rotational movement causes it to wobble with respect to base plate 12. Since drive plate 20 is carried on collar assembly 28 by a roller bearing, this gyratory or wobble motion is conveyed to toroidal member 16. In FIG. 2, the instantaneous position of drive plate 20 and collar assembly 28 is such that the low spot is on the left causing toroidal member 16 to be depressed into chamber 12. It can be seen how the bottom of chamber or groove 13 is generally congruent to the surface of toroidal member 16 so that the depression of flexible member 14 into groove 13 involves no sideways slippage of flexible member 14 along the walls of groove 13. Rather, flexible member 14 is compressed gently against the bottom and sides of groove 13 so as to force liquid around annular groove 13 and out exit port 30. The specific shape of groove 13 along with the positions of exit port 30 and entrance port 32 may be more easily seen in the top view of plate 12 provided by FIG. 3.

Returning to FIG. 2, it should be noted that despite the presence of roller bearing 26, there may still be some rotational motion imparted to drive plate 20 by collar assembly 28 due to slight misplacements of the center of rotation of the toroidal member with respect to the axis of the drive shaft. This problem is especially serious in the dual pump arrangement which will be described later with respect to FIG. 4. To ensure that none of this rotational motion is transmitted to toroid 16 thus causing an abrasion of flexible member 14, a needle bearing 18 is positioned between wobble drive plate 29 and toroidal member 16. Needle bearing 18 completely isolates toroidal member 16 from any of the rotational motion and thus ensures that there is no frictional sliding on flexible member 14 at all. If desired, needle bearing 18 may be replaced by a smooth plastic bearing of polytetrafluoroethylene or the like. It has been found that the use of bearing 18 so completely isolates toroidal member 16 from rotation that a swash plate may be substituted for drive plate 20, bearing 26, and collar 28. This is simpler configuration which is particularly suited for some lower speed embodiments.

Flexible member 14 may comprise any suitable elastic compound. In the preferred embodiment, the selection of materials for flexible member 14 and plate 12 is dependent upon the fluid which is to be pumped. Consideration should be given to the compatability of the materials involved. Different types of rubber compounds referred to as Viton and Buna-N which are trade names for certain compositions of synthetic rubber.

Plate 12 may be made from aluminum or steel or even plastic, if desired. Toroidal member 16 has been successfully constructed from different types of metals, plastics, and epoxy compounds. As further insurance against rotation, toroidal member 16 is mounted to an annular disc member 17 which has a small tab 19 extending outside its perimeter at the left in FIG. 2. Tab 19 extends around a pin 21 which pin is mounted between cover plate 22 and base plate 12. Pin 21 firmly anchors tab 19 and toroidal member 16 in position to ensure that there is no frictional motion against flexible member 14. A spring 23 mounted about pin 21 assists in holding toroidal member 16 firmly against flexible member 14. Toroidal member 16 is also urged downwardly against flexible member 14 by an additional bushing 25 positioned between the top of collar assembly 28 and bearing 27.

In looking at FIG. 2, it may be seen that housing 10, plates 22 and 12, and the bearings 27 and 29 form a cavity which, if sealed bearings are used, may be pressurized or evacuated so as to extend the range of operating pressures of my invention higher or lower respectively. That is, extremely high or low pressures in the annular grooves might explode or collapse the flexible member 14. However, a pressurized or evacuated chamber on the other side of member 14 would serve to protect against these difficulties.

Figure 4:
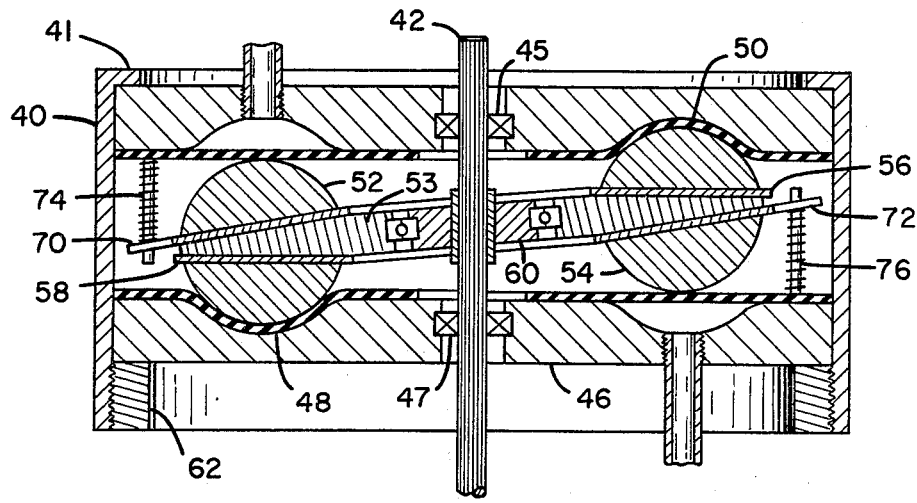
FIG. 4 is a sectional view of a dual pump version of the present invention in which one "wobble drive plate operates to drive two pumping grooves simultaneously.

Having explained the basic principles of my invention with respect to FIG. 2, reference should now be had to FIG. 4 which describes the most efficient embodiment of the present invention in which two annular pumps are driven from the same oscillating drive plate. FIG. 4 shows, in section, a cylindrical housing 40 containing a pair of base plates 44 and 46. It may be seen that both plates 44 and 46 contain incomplete annular grooves identical in nature to the annular groove described with respect to FIG. 2. A pair of flexible members 48 and 50 form these annular grooves into incomplete annular chambers which are continuously pumped by a pair of toroidal members 52 and 54 mounted on a single wobbling drive plate 53. As before, drive plate 53 is powered by a drive shaft 42 which is simply inserted into the pump through suitable bearings 45 and 47 in plates 44 and 46 and through a keyed or splined collar assembly 60 mounted at a slight angle about shaft 42. In FIG. 4 it is apparent that both annular cavities are continuously pumped by the same drive plate operating the two sides of the pump 180° out of phase.

A number of other design variations are shown in FIG. 4 which may apply to single-sided pumps as well. For example, cylindrical housing 40 has a ridge 41 designed to wrap around plate 44 so that plate 44 may be slid into position rather than threaded into position. Likewise, plate 46 slides into position and is held in place by a retainer ring 62 which is threaded into the lower end of cylindrical housing 40 and tightened until the two toroidal compression members 52 and 54 are firmly positioned as shown. Since the pump now drives on both sides of the drive plate 53, a thrust bearing such as utilized in FIG. 2 is no longer necessary.

Another unique variation shown in FIG. 4 involves the use of a pair of annular plastic discs 56 and 58 which provide a smooth sliding surface to the toroidal members and replace the needle bearing 18 used in FIG. 2. The plastic bearing is somewhat less expensive and less complicated than the needle bearing although in some applications may prove to be inadequate for extremely high speed operation of the pump. A pair of small tabs 70 and 72 extend outward from the plastic discs to engage a pair of pins 74 and 76 so as to help hold the toroidal member stationary in the same manner as described with respect to FIG. 2. In the preferred embodiment plastic discs constructed from polytetrafluoroethylene have been successfully employed.

Figure 5:
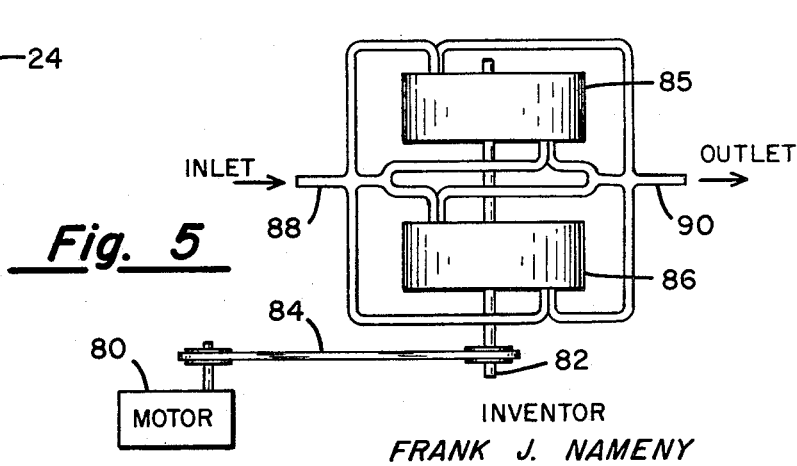
FIG. 5 shows in schematic form how one drive shaft may be used to power two pumps of the type shown in FIGS. 2 and 4.

One of the greatest advantages of my new pump resides in the fact that a straight shaft 42 is used to power the drive plate. This shaft may be simply inserted into he pump body from one end and because of this feature can be made long enough to slide simultaneously through any number of pumps desired so as to increase the pumping capacity and/or pressure of the system. In FIG. 5 a schematic diagram is presented showing how two pumps such as shown in FIG. 4 might be driven by a single motor and drive shaft. Motor 80 is used to drive shaft 82 by means of a suitable belt and pulley arrangement 84. Shaft 82 passes through a pair of pumps 85 and 86 and drives both of them simultaneously. An inlet line 88 is divided into four conduits and directed to the four inlets of the two dual pumps while the four outlet passageways are recombined to form a single outlet 90. Of course, the pumps could also be connected in series in order to increase the pressure of pumping and additional pumps could be driven off the same shaft 82 as well.

Figure 6:
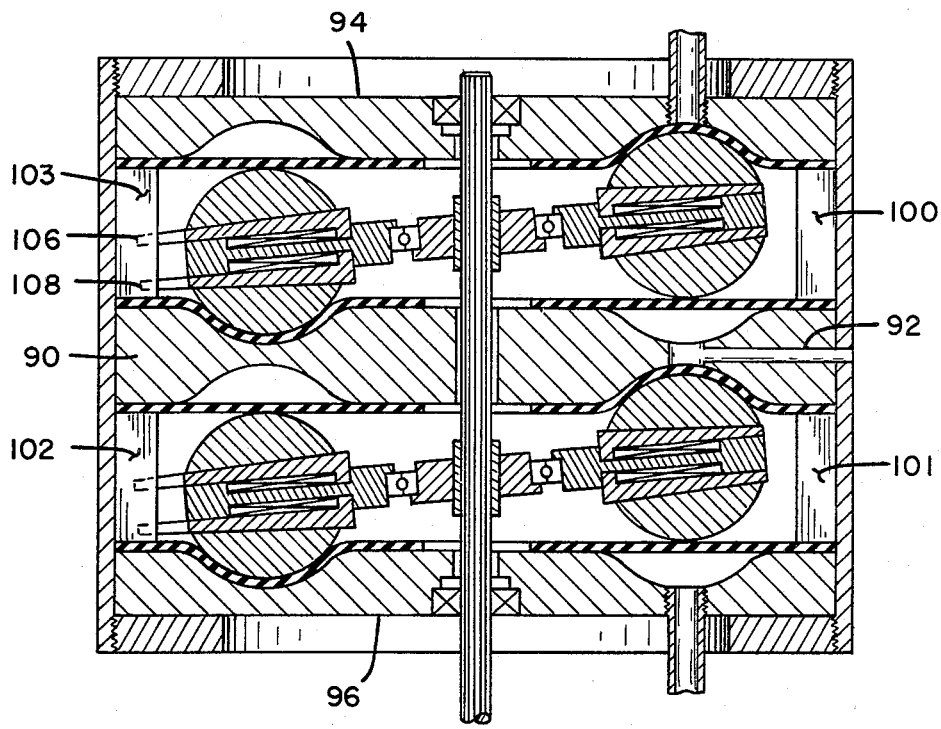
FIG. 6 demonstrates, in a sectional view, another version of my invention in which two pumps may be driven from a common drive shaft and also employ common components internal to the pumps.

Another highly efficient embodiment of my invention is shown in FIG. 6. In the sectional view of FIG. 2, an embodiment of my invention is shown in FIG. 6. In the sectional view of FIG. 2, an embodiment is shown in which a shaft is used to drive two pumps in the same housing body. In this case, the center plate 90 has incomplete annular grooves on both sides of it so as to provide four separate pumps in one unit. The inlet and outlet passages may be combined as shown by passageway 92. In this embodiment the positions of plates 90, 94 and 96 are determined by a set of spacers 100, 101, 102 and 103. The mounting plates for the toroidal compression members both extend in the same direction in this embodiment. Two tabs 106 and 108 extend into slots in spacer 103 in order to retain the toroidal members in the proper position. A set of four needle bearings are used in this embodiment but again, plastic bearings may be used interchangeably with the needle bearing arrangement of FIG. 6.

The various embodiments shown here are not intended to be exhaustive of the possibilities provided by the use of a straight through shaft operating to drive slightly inclined collar assemblies. Many more arrangements could be employed incorporating different types of bearings and different combinations of toroidal members and annular grooves to produce a wide variety of high speed, long-wearing pumps. To encompass all of the structural variations properly within the spirit and scope of the invention, the following claims are presented.

I claim:
1. A fluid pump comprising in combination:
   a base plate having an incomplete annular groove therein;
   a drive shaft;
   a flexible member bonded to said plate so as to close said groove into an incomplete annular cavity;
   an incomplete annular compression member generally congruent to said groove positioned adjacent to said flexible member and said groove;
   a drive member assembly, said drive member assembly adapted to receive said drive shaft at an angle therethrough so that rotation of said drive shaft produces a gyratory depression of said drive member, said compression member, and said flexible member into said annular cavity;
   an annular bearing between said compression member and said drive member assembly and a rotary bearing between the annular bearing contacting portion of said drive member assembly and the drive shaft contacting portion of said drive member assembly, which bearings completely isolate said compression member from any rotational motion about said drive shaft;
   an inlet port in communication with one end of said annular cavity;
   an outlet port in communication with the other end of said annular cavity; and
   a drive bearing in said base plate positioned concentrically to said annular cavity and adapted to carry said drive shaft.

2. The apparatus of claim 1 in which said annular bearing comprises a fluorinated plastic low friction surface on said drive member.

3. The apparatus of claim 1 in which the bottom of said groove comprises a relatively shallow curved surface without any friction producing surfaces generally parallel to the direction of said depressional motion of said compression member into said annular cavity and in which said compression member has a flexible member contacting surface closely approximating the shape of said groove.

4. The apparatus of claim 3 including another base plate with another incomplete annular groove closed into an incomplete annular cavity by a flexible member, said other cavity adapted to receive a gyratory depression from another incomplete annular compression member driven from the opposite side of said drive member assembly so as to comprise a second pump chamber driven from the same drive shaft, the other base plate also having a drive shaft carrying bearing positioned concentrically to said annular groove.

5. The apparatus of claim 1 including locating arm means extending from said compression member to an anchoring point so as to prevent rotation of said compression members relative to said annular grooves.

6. The apparatus of claim 5 including a housing for containing said base plates and said members.

7. The apparatus of claim 6 in which said housing contains at least one additional drive member assembly adapted to orbitally depress another set of flexible members into another set of incomplete annular grooves with inlet and outlet ports, said additional drive member adapted to also be driven from said drive shaft.

8. The apparatus of claim 7 in which one annular groove from the first pump set and one annular groove from the other pump set are both formed in the same plate positioned between the two drive member assemblies.

References Cited
UNITED STATES PATENTS

| | | | |
|---|---|---|---|
| 2,752,852 | 7/1956 | Offutt | 417—474 |
| 1,797,491 | 3/1931 | Ahlberg | 418—53 |
| 3,323,466 | 6/1967 | Ford | 418—53 |
| 2,249,806 | 7/1941 | Bogoslowsky | 418—45 |
| 2,636,444 | 4/1953 | Salgues | 418—51 |
| 2,915,983 | 12/1959 | Berrian | 418—45 |

FOREIGN PATENTS

| | | | |
|---|---|---|---|
| 640,282 | 5/1962 | Italy | 417—474 |

CARLTON R. CROYLE, Primary Examiner

J. J. VRABLIK, Assistant Examiner

U.S. Cl. X.R.

418—152, 210, 215; 417—476